No. 852,715. PATENTED MAY 7, 1907.
T. K. GRIFFITH.
COTTON TOPPER.
APPLICATION FILED FEB. 25, 1907.
2 SHEETS—SHEET 1.
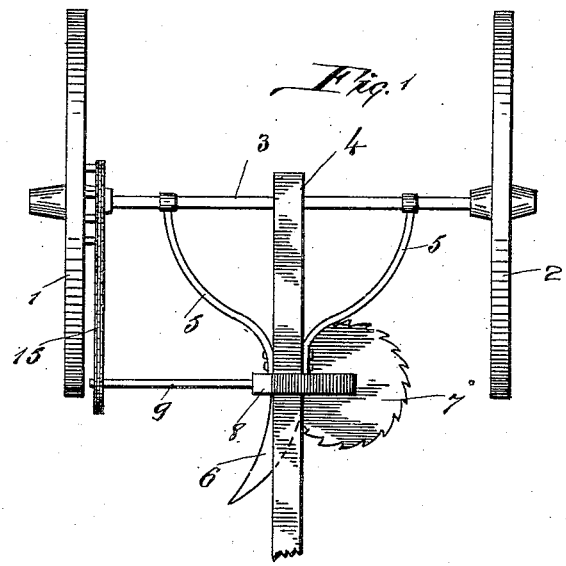
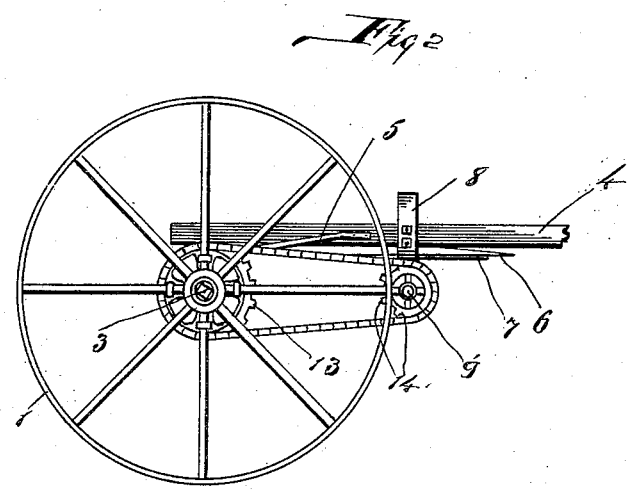
Witnesses
Inventor,
T. K. Griffith,
By A. L. Jackson,
Attorney
THE NORRIS PETERS CO., WASHINGTON, D. C.

No. 852,715. PATENTED MAY 7, 1907.
T. K. GRIFFITH.
COTTON TOPPER.
APPLICATION FILED FEB. 25, 1907.
2 SHEETS—SHEET 2.
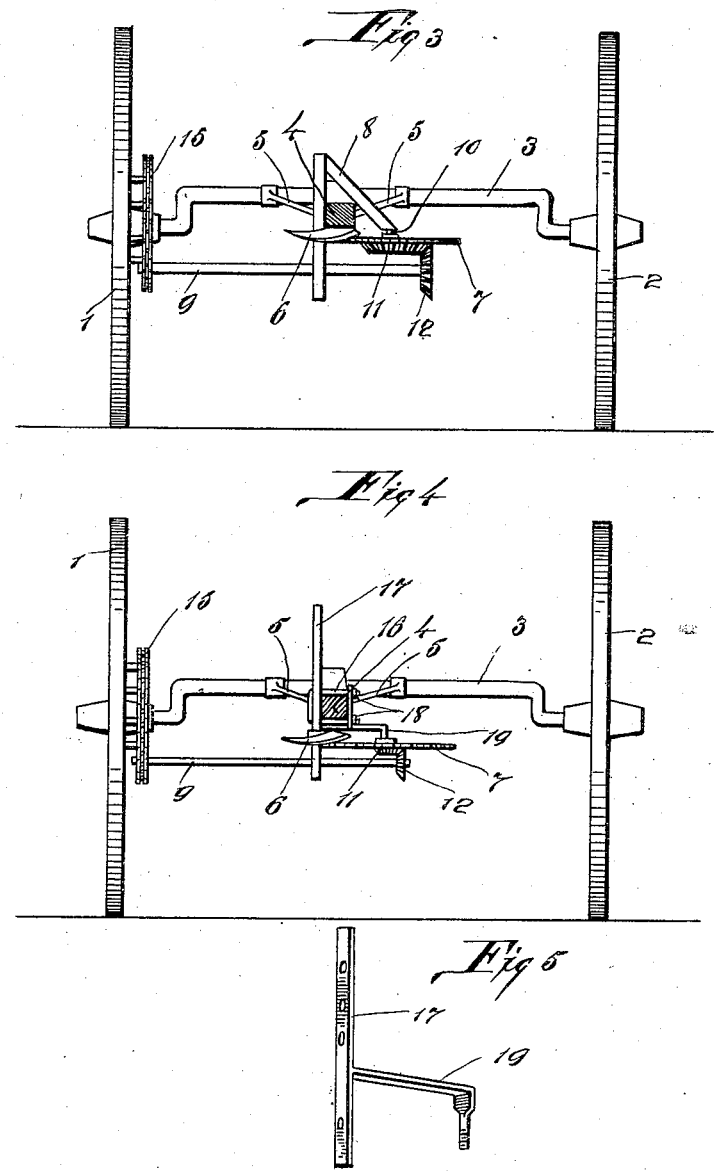
Witnesses
B. J. Lorkowski.
J. W. Stitt.
Inventor,
T. K. Griffith,
By A. L. Jackson,
Attorney
THE NORRIS PETERS CO., WASHINGTON, D. C.

UNITED STATES PATENT OFFICE.

THOMAS K. GRIFFITH, OF NOCONA, TEXAS.

COTTON-TOPPER.

No. 852,715.　　　　Specification of Letters Patent.　　　Patented May 7, 1907.

Application filed February 25, 1907. Serial No. 359,124.

*To all whom it may concern:*

Be it known that I, THOMAS K. GRIFFITH, a citizen of the United States, residing at Nocona, county of Montague, and State of Texas, have invented certain new and useful Improvements in Cotton-Toppers, of which the following is a specification.

My invention relates to an agricultural implement and more particularly to devices for clipping the tops of cotton plants to prevent the plants from growing too high. It is well known that when cotton plants grow too fast and grow too high, they do not fruit well. When the tops are clipped they spread more, have more branches to bear fruit or cotton bolls.

The object of my invention is to provide simple and inexpensive devices for clipping the tops of cotton any desirable height.

Other objects and advantages will be fully explained in the following description and the invention will be more particularly pointed out in the claims.

Reference is had to the accompanying drawings which form a part of this application and specification.

Figure 1 is a plan view of a wheeled carriage with my invention applied thereto. Fig. 2 is a side elevation of the same. Fig. 3 is a front elevation of the same. Fig. 4 is a front elevation of a wheeled carriage with my invention applied thereto, but showing a variation in the manner of mounting the invention on the carriage. Fig. 5 is a perspective view of the yoke shown in Fig. 4.

Similar characters of reference indicate the same parts throughout the several views.

The topping devices herein set forth will be shown attached to or mounted on an ordinary cultivator frame, as the devices can be readily attached to a cultivator frame. The carriage has wheels 1 and 2, an axle 3, a tongue 4, and hounds 5. The cutting devices are a blade 6 and a rotary toothed knife 7. A yoke 8 is mounted on and rigidly clamped on the tongue 4. A shaft 9 is journaled in the lower part of the yoke 8 and the rotary knife 7 is mounted on a spindle 10 which may be secured in or formed integral with the yoke 8. A bevel gear wheel 11 is made rigid with the rotary knife 7 and a bevel gear wheel 12 is mounted on shaft 9 to drive the wheel 11. The blade 6 may be bolted to the yoke 8 and to the tongue 4. The shaft is driven by means of power derived from the movement of the cultivator carriage. A sprocket wheel 13 is mounted on the axle 3 and made rigid with the wheel 1 of the cultivator carriage. A sprocket wheel 14 is mounted on shaft 9. A sprocket chain 15 is mounted on the sprocket wheels 13 and 14 for transmitting the power of wheel 1 to the shaft 9. It will be seen that when the cultivator carriage is moved the cutting devices will operate.

Figs. 4 and 5 show a variation in the manner of mounting the cutting devices. The yoke 17 is constructed with a vertical portion which has a series of holes to receive a U-bolt 16 which is made to clamp the yoke 17 to the tongue 4 by means of nuts 18 which engage the ends of the U-bolt. The blade 6 may be attached to the yoke 17 in any suitable manner. The yoke 17 has an arm 19 which has a spindle formed thereon for supporting the rotary knife 7. The shaft 9 is journaled in the lower part of the yoke 17. The yoke 17 may be adjusted vertically by placing the U-bolt 16 in different holes in the vertical portion of said yoke. The blade 6 is mounted stationary on the yoke and the knife 7 rotates and co-operates with the blade 6 somewhat as the two blades of a pair of scissors. As the cultivator moves along the tops of the cotton are caught by the rotary knife 7 and brought toward the blade 6 and the tops are cut as the teeth of the rotary knife are about to pass under the blade 6.

Having fully described my invention, what we claim as new and desire to secure by Letters Patent, is,—

1. A cotton topper comprising a wheeled truck provided with a tongue, a yoke mounted on said tongue, a blade attached to said yoke and said tongue, a rotary knife mounted on said yoke and co-operating with said blade, a bevel gear wheel rigid with said rotary knife, a shaft journaled in said yoke and carrying a bevel gear wheel for driving said first-named gear-wheel, and means for transmitting the power of the truck wheels to said shaft.

2. A cotton topper comprising a wheeled truck provided with a tongue, a yoke attached to said tongue and carrying a vertical spindle, a rotary knife mounted on said spindle, a blade attached to said yoke and co-operating with said knife, a bevel gear wheel mounted on said spindle and rigid with said knife, a shaft journaled in said yoke and carrying a bevel gear wheel for driving said first-named gear wheel, and means for transmitting the power of the truck wheels to said shaft.

3. A cotton topper comprising a wheeled truck provided with a tongue, a vertically adjustable yoke attached to said tongue and having an arm provided with a spindle, a rotary knife having a bevel gear wheel rigid therewith mounted on said spindle, a blade attached to said yoke and co-operating with said knife, a shaft journaled in said yoke and carrying a bevel gear wheel for driving said knife, and means for transmitting the power of the truck wheels to said shaft.

In testimony whereof, I set my hand in the presence of two witnesses, this 12th day of February, 1907.

THOMAS K. GRIFFITH.

Witnesses
    J. M. ROWLAND,
    W. M. ROLES.